United States Patent
Gu

(10) Patent No.: US 8,982,790 B2
(45) Date of Patent: Mar. 17, 2015

(54) OVERCHARGING PREVENTION BY UNSENT DOWNLINK DATA VOLUME RECORD

(75) Inventor: Hui Gu, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 142 days.

(21) Appl. No.: 13/510,488

(22) PCT Filed: Nov. 24, 2009

(86) PCT No.: PCT/CN2009/001306
§ 371 (c)(1),
(2), (4) Date: Jun. 14, 2012

(87) PCT Pub. No.: WO2011/063543
PCT Pub. Date: Jun. 3, 2011

(65) Prior Publication Data
US 2012/0307730 A1  Dec. 6, 2012

(51) Int. Cl.
  *H04W 4/00* (2009.01)
  *H04L 12/14* (2006.01)
  *H04M 15/00* (2006.01)
  *H04W 4/24* (2009.01)
(52) U.S. Cl.
  CPC .......... *H04W 4/24* (2013.01); *H04M 2215/146* (2013.01); *H04L 12/1403* (2013.01); *H04M 15/41* (2013.01); *H04M 15/00* (2013.01); *H04M 15/60* (2013.01); *H04M 2215/14* (2013.01)
  USPC ........................................................ 370/328
(58) Field of Classification Search
  None
  See application file for complete search history.

(56) References Cited

U.S. PATENT DOCUMENTS

| 8,218,535 | B1* | 7/2012 | Hurtta et al. | 370/356 |
| 2002/0080819 | A1* | 6/2002 | Tsao | 370/469 |
| 2002/0150084 | A1* | 10/2002 | Lee et al. | 370/352 |
| 2002/0174212 | A1* | 11/2002 | Casati et al. | 709/223 |
| 2003/0002480 | A1* | 1/2003 | Giustina et al. | 370/352 |
| 2003/0126435 | A1* | 7/2003 | Mizell et al. | 713/168 |
| 2003/0194997 | A1* | 10/2003 | Huomo | 455/432.1 |
| 2006/0056396 | A1* | 3/2006 | Chao et al. | 370/352 |
| 2008/0096523 | A1* | 4/2008 | Lundin et al. | 455/406 |
| 2008/0163309 | A1* | 7/2008 | Kauranen | 725/62 |

(Continued)

FOREIGN PATENT DOCUMENTS

| CN | 1747589 A | 3/2006 |
| CN | 101068150 A | 11/2007 |
| CN | 101197817 A | 6/2008 |

(Continued)

OTHER PUBLICATIONS

3RD Generation Partnership Project. "User Plane for the IP Domain." 3GPP TSG SA WG2, TDoc C-99-055, Stockholm, Sweden, Mar. 15-19, 1999.

*Primary Examiner* — Otis L Thompson, Jr.
(74) *Attorney, Agent, or Firm* — Coats & Bennett, P.L.L.C.

(57) ABSTRACT

The present invention provides a method for recording the unsuccessfully transmitted downlink data volume into the CDR generated by gateway support node in a telecommunication system. The method includes creating information relating to the unsuccessfully transmitted downlink data in a node and sending the information from the node to the gateway support node, to make the gateway support node know the volume of unsent downlink data. A node and gateway support node which adapted to prevent overcharging the user which is caused by the G-CDR are also provided.

16 Claims, 7 Drawing Sheets

(56) References Cited

U.S. PATENT DOCUMENTS

2009/0213749 A1* 8/2009 Han .............................. 370/252
2013/0114417 A1* 5/2013 Li et al. ......................... 370/242

FOREIGN PATENT DOCUMENTS

| CN | 101212319 A | 7/2008 |
| WO | 2005015825 A1 | 2/2005 |

* cited by examiner

OVERCHARGING PREVENTION BY UNSENT DOWNLINK DATA VOLUME RECORD

TECHNICAL FIELD

The present invention relates to telecommunication. In particular, the present invention relates to charging data records.

BACKGROUND

Traditional circuit switched telecommunications networks—both wired and wireless—typically base billing on connection time, such as call duration. Network elements, typically switching centers, generate records that contain user specific information about provided services for billing purposes. In the context of the circuit switched telecommunications networks these records are often called "call detail records".

With the advent of mobile packet data telecommunications networks various packet switched services have been introduced to consumers. In such second generation (2G) mobile telecommunications networks as Global System for Mobile Communications (GSM) and Code Division Multiple Access (CDMA) networks, packet data services are typically provided with General Packet Radio Service (GPRS) technology. Third Generation Partnership Project (3GPP) mobile telecommunications networks, often based on Wideband Code Division Multiple Access (W-CDMA), also have their associated packet data services which typically are further developments of the General Packet Radio Service technology.

Packet switched data allows providing a significantly increased amount of various data services. Packet switched data also allows more billing grounds. For example, charging may be based on volumes of data transferred rather than connection time.

The increased amount of data services and their associated billing options has led to a situation in which more and more network elements process records containing user specific information about provided packet data services for billing purposes, which records are often called "charging data records (CDR)" in the context of the packet switched telecommunications networks.

There are more network elements generating the records compared to traditional circuit switched telecommunications networks. For example, Serving General Packet Radio Service Support Nodes (SGSN) and Gateway General Packet Radio Service Support Nodes (GGSN) may generate charging data records. The generated charging data records are typically collected by a charging gateway which consolidates the records and transfers them to a billing system.

Now, G-CDR, which is the charging data record generated by GGSN, is much more wildly used by the operator for the charging purpose than S-CDR, which is the charging data record generated by SGSN. In especial, with the introduction of 3G direct tunnel where the payload is transported between GGSN and RNC (Radio Network Controller) directly and SGSN is no longer able to count data volumes associated with the PDP (Packet Data Protocol) context for which the direct tunnel is established, there is no payload can be recorded in S-CDR and only G-CDR can be used for charging of 3G direct tunnel.

In brief, a PDP context activation procedure may be initiated by a MS (Mobile Station). The MS send an "Activate PDP Context Request" message, which carries information such as APN, QoS (Quality of Service Profile) requested and so on, to the SGSN. The SGSN then requests for the corresponding GGSN address according to the APN from the DNS (Domain Name System), and further sends a request for creating PDP context to GGSN after obtaining the GGSN address from the DNS. Responding to said request, the GGSN returns a "Create PDP Context Response" message to the SGSN, which carries an assigned end user address like IPv6 address, and other information such as QoS attributes, etc. After then, the SGSN sends the information derived from the GGSN to the MS via an "activate PDP Context Accept" message. Thus, the PDP activation is done.

Further, before the SGSN sends the "activate PDP Context Accept" message, the SGSN and RNC exchange information for setting up a RAB for payload traffic between the MS and the SGSN. Usually, the volume of unsuccessfully transmitted downlink data is sent to the SGSN within a "RAB assignment Response" message by RNC.

However, as for any telecommunication system using the GGSN to generate the charging data records, such as 3GPP and so forth, still creates the charging data records without including the unsuccessfully transmitted downlink data volume since the GGSN is not informed. This may result in that users are overcharged, as may give rise to a negative attitude towards a telecommunication operator and/or the services provided.

Hence, it would be desirable to make the GGSN know how much downlink data unsent by RNC if there is downlink data not transferred by RNC.

SUMMARY

Therefore, it is one object of the present invention to address the above disadvantages by providing a method, an apparatus for making the gateway support node be informed of the volume of unsuccessfully transmitted downlink data, for further preventing overcharging the user due to the charging data record been generated by the gateway support node.

According to one embodiment of the invention, a method for a node involved in downlink data transport between a gateway support node and a mobile station is provided, where the method comprises creating information relating to a volume of unsuccessfully transmitted downlink data by said node and sending said information to said gateway support node by said node.

According to one aspect of the embodiment, the information is included in an information element pre-determined for unsuccessfully transmitted downlink data.

Wherein said information element is included in one of a Packet Data Protocol (PDP) context activation, PDP context modification and PDP context deactivation messages.

Wherein said message is of a request or a response type.

According to one aspect of the present invention, a method for a gateway support node sending downlink data to a mobile station is provided, wherein the method comprises receiving information relating to a volume of unsuccessfully transmitted downlink data by said gateway support node, including said information in a charging data record, and sending said charging data record for billing.

Wherein the information is included in an information element pre-determined for unsuccessfully transmitted downlink data volume.

According to another embodiment of the present invention, a node in a telecommunication network comprising a gateway support node sending downlink data to a mobile station is provided, wherein the node comprises means for creating information relating to a volume of unsuccessfully transmitted downlink data, and means for sending said information to said gateway support node.

Wherein, the means for creating said information is further characterized by including said information in an information element pre-determined to contain an unsuccessfully transmitted downlink data volume.

Wherein, the means for creating said information is further characterized by including said information element in one of Packet Data Protocol (PDP) context activation, PDP context modification and PDP context deactivation messages, said message being a request or a response type message.

According to one aspect of the embodiment, a gateway support node in a telecommunication network sending downlink data to a mobile station is provided, where the gateway support node comprises means for receiving information relating to a volume of unsuccessfully transmitted downlink data, means for including said information in a charging data record and means for sending said charging data record for billing.

Wherein, the means for including said information is further characterized by including said information in an information element pre-determined to contain an unsuccessfully transmitted downlink data volume.

Wherein, the means for including said information is further characterized by including said information element in a pre-determined field of a charging data record.

According to another embodiment of the present invention, an apparatus which includes above described node and above described gateway support node is provided.

BRIEF DESCRIPTION OF THE DRAWINGS

The above and other aspects, features, and advantages of the present invention will be more apparent from the following more particular description thereof, presented in conjunction with the accompanying drawings, in which.

DETAILED DESCRIPTION

Without the intention of a limitation, the invention will now be explained by its application in 3GPP mobile telecommunications networks, wherein the serving support node is Serving General Packet Radio Service Support Node (SGSN), and the gateway support node is Gateway General Packet Radio Service Support Node (GGSN).

In brief, the present invention make the GGSN also know information relating to unsuccessfully transmitted downlink data such as volume and record the unsent downlink volume into the G-CDR.

Figure 1:
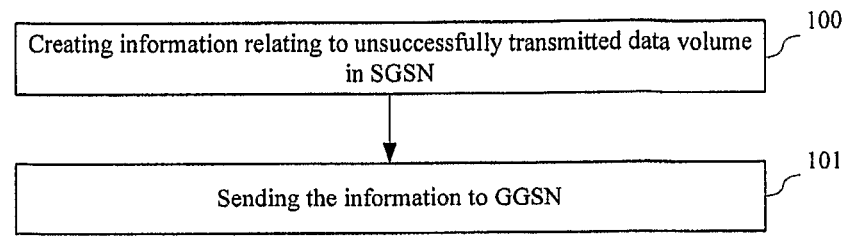
FIG. 1 is a flow diagram illustrating the method according to the present invention.

FIG. 1 is a flow diagram illustrating the method according to the present invention. As shown in FIG. 1, in step of 100, the SGSN creates information relating to unsuccessfully transmitted downlink data volume, wherein the information is included in an information element which is pre-determined for unsuccessfully transmitted downlink data volume. The information element is further included in one of a PDP context activation, PDP context modification and PDP context deactivation message.

In this document, the information element may be called "RNC Unsent Downlink Volume" as shown in Table 1, and may take the same format with "Unsuccessfully Transmitted Data Volume" which is present in section 9.2.3.12 of 3GPPTS.25.413 V7.10.0 (2009 March).

TABLE 1

Format of "RNC Unsent Downlink Volume"

| IE/Group Name | Type and reference | Semantics description |
| --- | --- | --- |
| RNC Unsent Downlink Volume | INTEGER $(0 \ldots 2^{32} - 1)$ | Unit is octet. |

That is, the information element (IE) is called "RNC Unsent Downlink Volume", whose unit is octet, and it may be one of integers from 0 to $2^{32}-1$. However, it should be noted, this is only used as an example, not as a limitation.

The pre-determined information element "RNC Unsent Downlink Volume" is included in the existing GGSN PDP context charging data as a new CDR field, wherein the GGSN PDP context charging data gives an existing collection of a CDR data; and is also included in the messages "Update PDP Context Request", "Update PDP Context Response", "Delete PDP Context Request" and "Delete PDP Context Response" which are all sent by SGSN.

The existing GGSN PDP context charging data (G-CDR) is introduced in section 6.1.2 of 3GPP TS 32.251. And the details on existing "Update PDP Context Request", "Update PDP Context Response", "Delete PDP Context Request" and "Delete PDP Context Response" messages are seen in sections 7.3.3, 7.3.4, 7.3.5 and 7.3.6 of 3GPP TS 29.060.

According to the present invention, the information element RNC Unsent Downlink Data is included in the GGSN PDP context charging data as shown in Table 2. As a new field of GGSN PDP context data, the RNC Unsent Downlink Volume, with $O_c$ ($O_c$ means operator have provisioned to be included in the CDR if certain conditions are met) category, describes the volume of unsuccessfully transmitted downlink data which the RNC has not sent to the MS, and this field is present when the RNC has provided unsuccessfully transmitted downlink volume count at RAB release.

TABLE 2

| Field | Category | Description |
| --- | --- | --- |
| Record Type | M | GGSN PDP context record. |
| Network initiated PDP context | $O_C$ | A flag that is present if this is a network initiated PDP context. |
| Served IMSI | M | IMSI of the served party. |
| Served IMEISV | $O_C$ | IMEISV of the ME, if available. |
| GGSN Address used | M | The control plane IP address of the GGSN used. |
| Charging ID | M | PDP context identifier used to identify this PDP context in different records created by GSNs |
| SGSN Address | M | List of SGSN addresses used during this record. |
| Access Point Name Network Identifier | $O_M$ | The logical name of the connected access point to the external packet data network (network identifier part of APN). |
| PDP Type | $O_M$ | PDP type, i.e. IP, PPP, or IHOSS:OSP. |
| Served PDP Address | $O_C$ | PDP address, i.e. IPv4 or IPv6. This parameter shall be present except when both the PDP type is PPP and dynamic PDP address assignment is used. |
| Dynamic Address Flag | $O_C$ | Indicates whether served PDP address is dynamic, which is allocated during PDP context activation. This field is missing if address is static. |
| List of Traffic Data Volumes | $O_M$ | A list of changes in charging conditions for this PDP context, each change is time stamped. Charging conditions are used to categorize traffic volumes, such as per tariff period. Initial and subsequently changed QoS and corresponding data values are also listed. |
| Record Opening Time | M | Time stamp when PDP context is activated in this GGSN or record opening time on subsequent partial records. |
| MS Time Zone | $O_C$ | This field contains the MS Time Zone the MS is currently located as defined in TS 29.060 [203], if provided by SGSN. |
| Duration | M | Duration of this record in the GGSN. |
| Cause for Record Closing | M | The reason for the release of record from this GGSN. |
| Diagnostics | $O_M$ | A more detailed reason for the release of the connection. |
| Record Sequence Number | C | Partial record sequence number, only present in case of partial records. |
| Node ID | $O_M$ | Name of the recording entity. |
| Record Extensions | $O_C$ | A set of network operator/manufacturer specific extensions to the record. Conditioned upon the existence of an extension. |
| Local Record Sequence Number | $O_M$ | Consecutive record number created by this node. The number is allocated sequentially including all CDR types. |
| APN Selection Mode | $O_M$ | An index indicating how the APN was selected. |
| Served MSISDN | $O_M$ | The primary MSISDN of the subscriber. |
| User Location Information | $O_C$ | This field contains the User Location Information of the MS as defined in TS 29.060 [203], if provided by SGSN. |
| Charging Characteristics | M | The Charging Characteristics applied to the PDP context. |
| Charging Characteristics Selection Mode | $O_M$ | Holds information about how Charging Characteristics were selected. |
| IMS Signalling Context | $O_C$ | Included if the IM-CN Subsystem Signalling Flag is set, see [201]PDP context is used for IMS signalling. |
| External Charging Identifier | $O_C$ | Holds a Charging Identifier and is present only if it is received from a non-GPRS, external network entity |
| SGSN PLMN Identifier | $O_M$ | SGSN PLMN Identifier (MCC and MNC) used during this record. |
| CAMEL Information | $O_C$ | Set of CAMEL information related to PDP context. This field is present if CAMEL Charging Information is received by the GGSN in the GTP Create PDP context request. |
| RAT Type | $O_C$ | This field indicates the Radio Access Technology (RAT) type currently used by the Mobile Station as defined in TS 29.060 [204]. The field is present in the G-CDR if provided by SGSN. |
| RNC Unsent Downlink Volume | $O_C$ | The downlink data volume, which the RNC has not sent to MS. This field is present when the RNC has provided unsent downlink volume count at RAB release. |

Also, the information element is included in the existing message Updated PDP Context Request sent by SGSN as following Table 3.

TABLE 3

Information Elements in an Update PDP Context Request sent by SGSN

| Information element | Presence requirement | Reference |
|---|---|---|
| IMSI | Conditional | 7.7.2 |
| Routeing Area Identity (RAI) | Optional | 7.7.3 |
| Recovery | Optional | 7.7.11 |
| Tunnel Endpoint Identifier Data I | Mandatory | 7.7.13 |
| Tunnel Endpoint Identifier Control Plane | Conditional | 7.7.14 |
| NSAPI | Mandatory | 7.7.17 |
| Trace Reference | Optional | 7.7.24 |
| Trace Type | Optional | 7.7.25 |
| Protocol Configuration Options | Optional | 7.7.31 |
| SGSN Address for Control Plane | Mandatory | GSN Address 7.7.32 |
| SGSN Address for User Traffic | Mandatory | GSN Address 7.7.32 |
| Alternative SGSN Address for Control Plane | Conditional | GSN Address 7.7.32 |
| Alternative SGSN Address for User Traffic | Conditional | GSN Address 7.7.32 |
| Quality of Service Profile | Mandatory | 7.7.34 |
| TFT | Optional | 7.7.36 |
| Trigger Id | Optional | 7.7.41 |
| OMC Identity | Optional | 7.7.42 |
| Common Flags | Optional | 7.7.48 |
| RAT Type | Optional | 7.7.50 |
| User Location Information | Optional | 7.7.51 |
| MS Time Zone | Optional | 7.7.52 |
| Additional Trace Info | Optional | 7.7.62 |
| Direct Tunnel Flags | Optional | 7.7.81 |
| RNC Unsent Downlink Volume | Optional | |
| Private Extension | Optional | 7.7.46 |

The "Update PDP Context Request" message sent from SGSN to GGSN, may be communicated when any information element (or parameter) such as QoS need be re-negotiated and so on, to request for updating the PDP context. When the SGSN has been informed of the volume of unsuccessfully transmitted downlink data (for example by the RNC), the volume now is included in this message as a result of the pre-determined information element RNC Unsent Downlink Volume which is included in the "Update PDP Context Request" message.

The pre-determined information element RNC Unsent Downlink Volume is included in the "update PDP context response" message sent by SGSN, as shown in table 4.

TABLE 4

Information Elements in an Update PDP Context Response sent by SGSN

| Information element | Presence requirement | Reference |
|---|---|---|
| Cause | Mandatory | 7.7.1 |
| Recovery | Optional | 7.7.11 |
| Tunnel Endpoint Identifier Data I | Optional | 7.7.13 |
| Protocol Configuration Options | Optional | 7.7.31 |
| SGSN Address for User Traffic | Optional | GSN Address 7.7.32 |
| Quality of Service Profile | Conditional | 7.7.34 |
| Direct Tunnel Flags | Optional | 7.7.81 |
| RNC Unsent Downlink Volume | Optional | |
| Private Extension | Optional | 7.7.46 |

Also, the information element RNC Unsent Downlink Volume is included in the existing Delete PDP Context Request message sent by SGSN, as shown in Table 5. The message "Delete PDP Context Request" is used to delete the PDP context, and when the unsuccessfully transmitted data volume has been sent to the SGSN, the SGSN sends the volume to the GGSN via this message due to including the information element RNC Unsent Downlink Volume.

TABLE 5

Information Elements in a Delete PDP Context Request sent by SGSN

| Information element | Presence requirement | Reference |
|---|---|---|
| Teardown Ind | Conditional | 7.7.16 |
| NSAPI | Mandatory | 7.7.17 |
| Protocol Configuration Options | Optional | 7.7.31 |
| RNC Unsent Downlink Volume | Optional | |
| Private Extension | Optional | 7.7.46 |

In addition, the information element RNC Unsent Downlink Volume is included in the existing "Delete PDP Context Response" message sent by the SGSN, as shown in Table 6.

TABLE 6

Information Elements in a Delete PDP Context Response by SGSN

| Information element | Presence requirement | Reference |
|---|---|---|
| Cause | Mandatory | 7.7.1 |
| Protocol Configuration Options | Optional | 7.7.31 |
| RNC Unsent Downlink Volume | Optional | |
| Private Extension | Optional | 7.7.46 |

Figure 2:
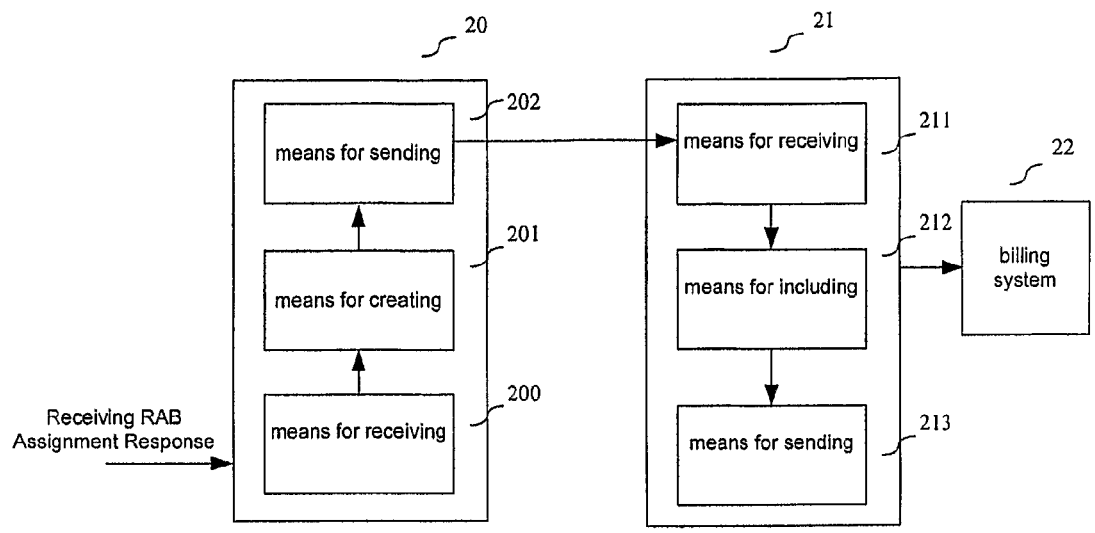
FIG. 2 is a block diagram illustrating an apparatus according to an embodiment of the present invention.

Then, in step of 101, the information is sent such as by the SGSN 20 of FIG. 2, for example via a message, to such as the GGSN 21 of FIG. 2, such that the GGSN is informed of the unsuccessfully transmitted data volume.

Figure 1A:
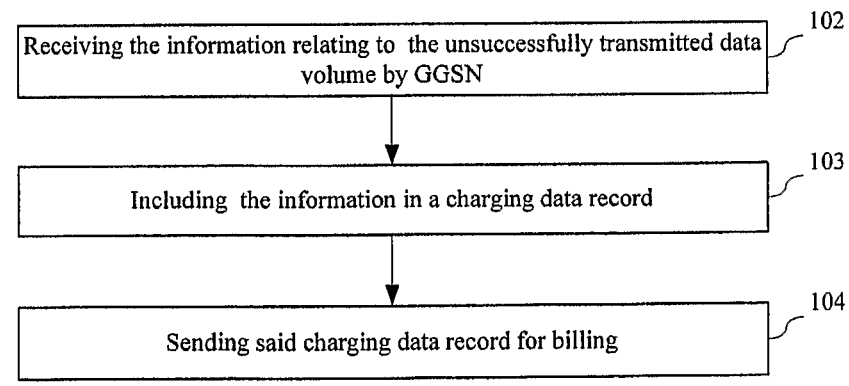
FIG. 1A is an another flow diagram illustrating the method according to the present invention.

FIG. 1A is another flow diagram illustrating the method according to the present invention. In step of 102, the GGSN receives the information sent by the SGSN to be aware of the volume of unsuccessfully transmitted downlink data. And in step of 103, the GGSN generates the CDR including the record of unsuccessfully transmitted downlink data volume based on the received information. Then, in step of 104, the GGSN sends the CDR (for example to a billing system) for billing.

FIG. 2 is a block diagram illustrating an apparatus according to an embodiment of the present invention. The apparatus includes a Serving General Packet Radio Service Support Node SGSN 20 and a Gateway General Packet Radio Service Support Node GGSN 21, wherein the GGSN 21 is used to generate the CDR for a telecommunication network and send the records to a billing system 22.

The SGSN node 20 includes means 200 for receiving at least the message relating to the unsuccessfully transmitted downlink data, such as the RAB assignment Response message from the RNC; means 201 for creating the information relating to the unsuccessfully transmitted downlink data based on the message received by means 200; and means 202 for sending the information created by means 201 which is relating to the volume of unsuccessfully transmitted downlink data to the GGSN 21. As an example, the means 200 for receiving can be a receiving unit or input unit of the SGSN, the means 201 for creating can be a processing unit of the SGSN, and the means 202 for sending can be a sending unit or output unit of the SGSN.

The GGSN 21 includes means 211 for at least receiving the information relating to the volume of unsuccessfully transmitted downlink data sent by the SGSN; means 212 for including the information in the CDR generated by the GGSN, wherein the information is recorded by the GGSN as a record with the volume of unsent downlink data; and means 213 for sending the CDR to a billing system 22 for billing. As an example, the means for receiving can be a receiving unit or input unit of the GGSN, the means 212 for including can be a processing unit of the GGSN, and the means 213 for sending can be a sending unit or output unit of the GGSN.

After receiving unsuccessfully transmitted downlink data volume via RAB assignment Response message from the RNC by the means 200 for receiving, the SGSN 20 creates information relating to unsuccessfully transmitted downlink data volume by means 201 for creating, wherein the information is included in an information element which is pre-determined for unsuccessfully transmitted downlink data volume. The information element is further included in one of a PDP context activation, PDP context modification and PDP context deactivation message.

The information element is called "RNC Unsent Downlink Volume" in this document, as shown in above described Table 1. Also, as above described, the information element is further included in the existing GGSN PDP context charging data as a new CDR field, wherein the GGSN PDP context charging data gives an existing collection of a CDR data; and is also included in the messages "Update PDP Context Request", "Update PDP Context Response", "Delete PDP Context Request" and "Delete PDP Context Response" which are all sent by SGSN.

Then, the means 202 for sending sends the information created by the means 201 for creating to the GGSN 21. The means 211 for receiving of the GGSN 21 receives the information and further includes the information into the CDR generated by the GGSN 21; wherein the information is recorded as a record with unsent downlink data. And the means 213 for sending then sends the message for billing to a billing system 22.

From above, the information relating to the unsuccessfully transmitted downlink data is transmitted to the GGSN by the message in the PDP context. Then the GGSN generates CDR with a record of the volume of unsent downlink data. Thus, the possibility of overcharging for downlink data volume in the billing system 22 is efficiently be prevented.

In an embodiment, any of the SGGN 20, the GGSN 21 and the apparatus illustrated in FIG. 2 can be used in a telecommunication network according to the present invention, to make gateway support node be informed of the volume of unsent downlink data; wherein the telecommunication network may be a mobile packet data telecommunications network, such as a GPRS network or 3GPP packet data network. When the gateway support node is aware of the volume of unsuccessfully transmitted downlink data, it yields the CDR with a record corresponding to this volume. Further, overcharging situation will not occur in this telecommunication network or the billing system combined with the telecommunication network.

Figure 3:
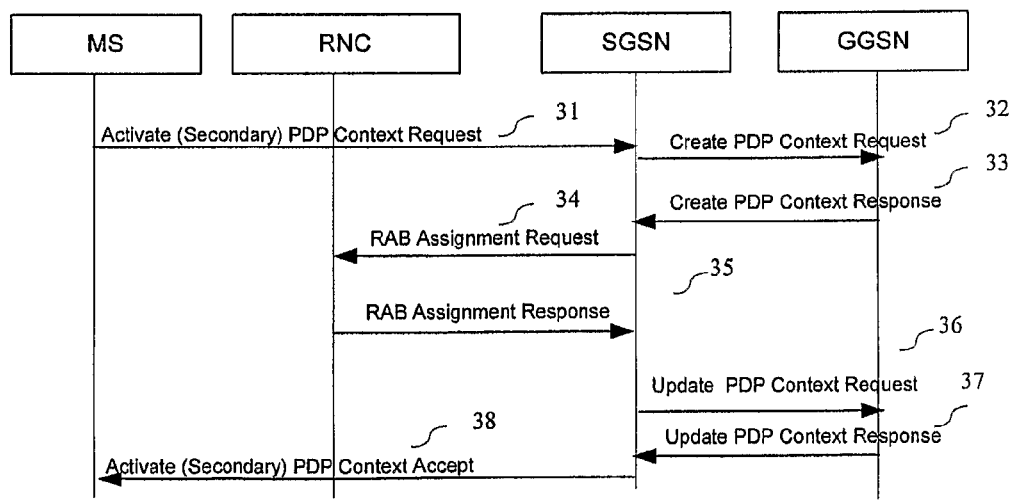
FIG. 3 depicts the PDP context activation according to the present invention.

FIG. 3 depicts the PDP context activation according to the present invention. In step of 31, the MS activates the PDP context by sending the "Activate PDP Context Request" message to the SGSN. After obtaining the GGSN address from DNS according to the Access Point Name Network Identifier in the message received from the MS, the SGSN then sends a "Create PDP Context Request" message to the GGSN to request for creating a PDP context in step of 32. On request of the "Create PDP Context Request" message, the GGSN sends a message of Create POP Context Response which carries information elements corresponding to the request form the SGSN to the SGSN in step of 33. In further step of 34, the SGSN requests to establish RAB with the RNC by a "RAB Assignment Request" message. And in step of 35, the RNC sends a response message "RAB Assignment Response" to the SGSN. Then the SGSN sends the "Update PDP context Request" message where the contents is shown in table 3 to the GGSN in step of 36. It should be understood that in PDP activation procedure, there is no any traffic before RAB is established, so in PDP activation procedure, there is no information of unsuccessfully transmitted downlink data volume carried by RAB Assignment Response message, that is, the information element RNC Unsent Downlink Data is included in the RAB Assignment Response does not present here. In following step of 37, the GGSN sends a response to the SGSN via Update PDP context Response message. And the SGSN thus sends the Activate PDP Context Accept message to the MS in step of 38, so a PDP context is activated.

Moreover, the secondary activation according to the present invention is similar to the PDP Context activation shown in FIG. 3, thus, the details of secondary activation will not be described in this document.

Figure 4:
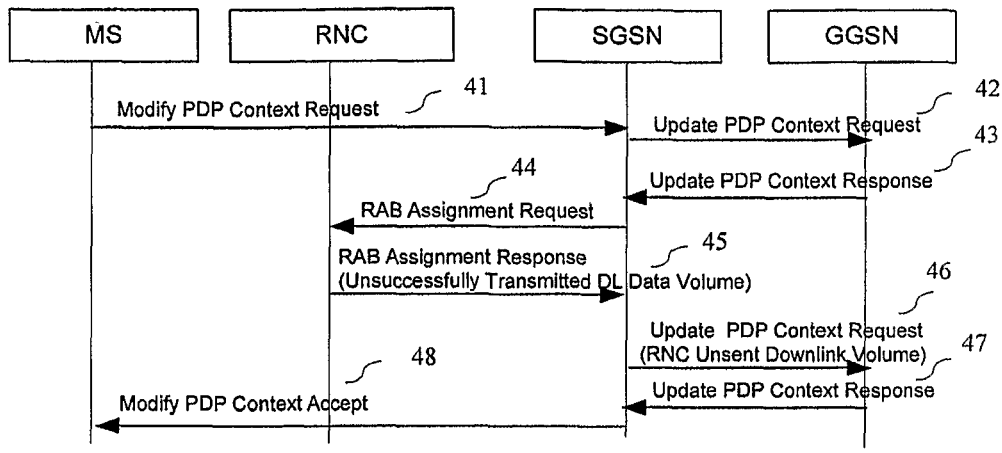
FIG. 4 depicts the PDP context Modification initiated by MS according to the present invention.

FIG. 4 depicts the PDP context Modification initiated by MS according to the present invention. In step of 41, the MS initiates a PDP context modification by sending the Modify PDP Context Request message to the SGSN. The SGSN then sends the Update PDP Context Request message to the GGSN for updating a PDP context in step of 42. In response of the Update PDP Context Request message, a message of Update PDP Context Response is sent to the SGSN by the GGSN in step of 43. Then, in step of 44, the SGSN requests the RNC to modify RAB by the RAB Assignment Request message. And in step of 45, the RNC sends a response message "RAB Assignment Response", which carries the RNC unsuccessfully transmitted downlink data volume when the RNC detects the existing of the unsent data. Then the SGCN sends the information of unsuccessfully transmitted downlink data volume to the GGSN in step of 46 via the Update PDP context Request message, in which the contents are shown in the Table 3. The GGSN then records the information relating to the unsuccessfully transmitted data volume, contained in the message, into the CDR which it yields. Accordingly, the G-CDR sent to the billing system has the field recording the unsent data volume. In following step of 47, the GGSN sends a response to the SGSN via Update PDP context Response message, and the GSSN thus sends the Modify PDP Context Accept message to the MS in step of 48. Thus a PDP context is modified.

Figure 5:
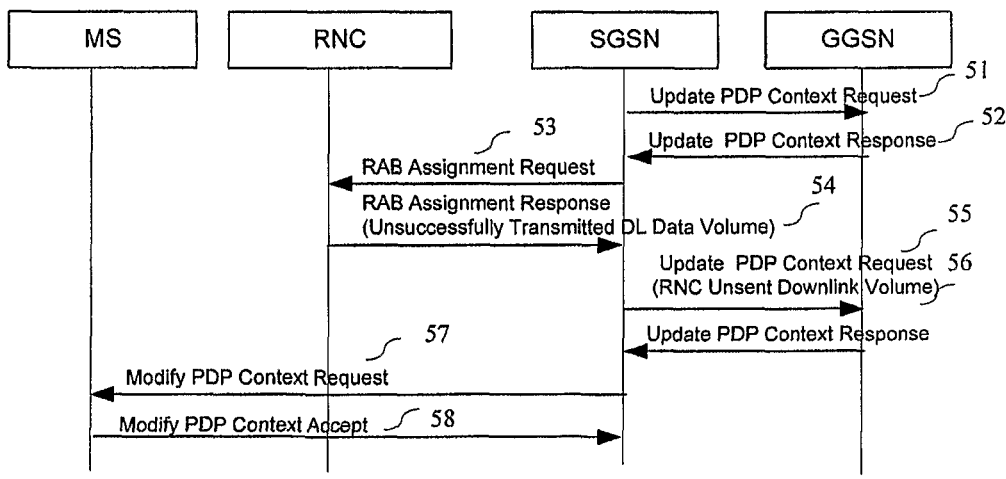
FIG. 5 depicts the PDP context Modification initiated by SGSN according to the present invention.

FIG. 5 depicts the PDP context Modification initiated by SGSN according to the present invention. In step of 51, the SGSN sends the Update PDP Context Request message to initiate the PDP context modification. And the GGSN responds the Update PDP Context Response message in step of 52. In further step of 53, the SGSN requests to modify RAB with the RNC by the RAB Assignment Request message. And in step of 54, the RNC sends a response message RAB Assignment Response, which carries the information relating to the RNC unsuccessfully transmitted downlink data volume when the RNC detects there is unsuccessfully transmitted downlink data. Then the SGSN sends said information to the GGSN in step of 55 via the Update PDP context Request message, where the unsuccessfully transmitted downlink data volume has been included based on the pre-determined information element RNC Unsent Downlink volume as shown in Table 3. The GGSN receives the message and includes the information relating to the unsuccessfully transmitted downlink data volume of the message into the CDR that it generates, to make said unsuccessfully transmitted downlink data volume be recorded in the G-CDR. Thus, there is a field recording said unsent data volume in the charging data records to the billing system. In following step of 56, the GGSN sends a response to the SGSN via the Update PDP context Response message. And the SGSN sends the Modify PDP Context request message to the MS in step of 57, and final the modification is done after the MS sends the Modify PDP Context Accept message to the SGSN in step of 58.

Figure 6:
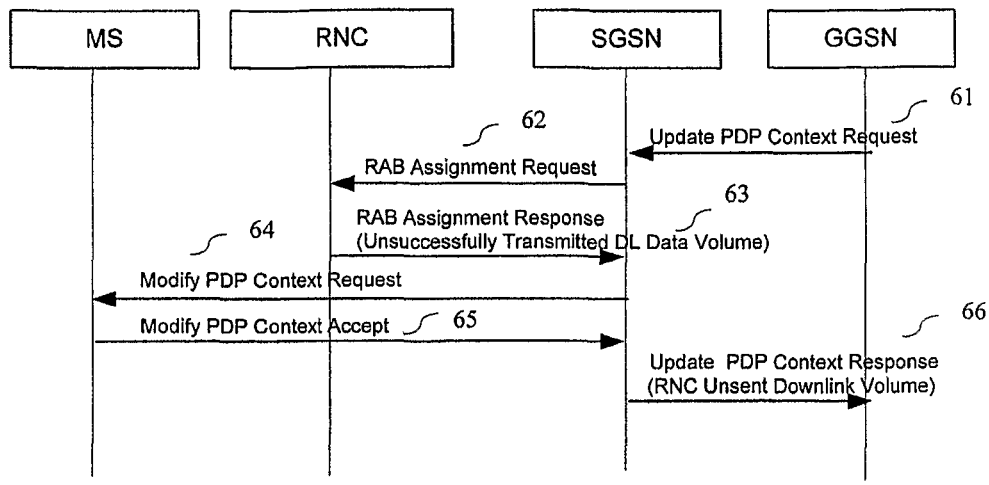
FIG. 6 depicts the PDP context Modification initiated by GGSN according to the present invention.

FIG. 6 depicts the PDP context Modification initiated by GGSN according to the present invention. In step of 61, a PDP context modification is initiated by GGSN sending the update PDP Context Request message. And the SGSN then sends a request for modifying RAB with the RNC by a message "RAB Assignment Request" in step of 62. And in step of 63, the RNC sends a response message "RAB Assignment Response", which carries the information relating to the RNC unsuccessfully transmitted downlink data volume in case of existing of the unsuccessfully transmitted downlink data. In following step of 64, the SGSN sends the Modify PDP Context request message to the MS. Then the MS sends the Modify PDP Context response message to the SGSN in step of 65. The SGSN further sends the volume of unsuccessfully transmitted downlink data to the GGSN by the Update PDP context Response message where the contents shown in table 4, that is, the message includes the information element RNC Unsent Downlink Volume which is associated with unsuccessfully transmitted downlink data volume, is received by the GGSN. The GGSN further generates the CDR with a field recording the unsuccessfully transmitted downlink data volume.

Figure 7:
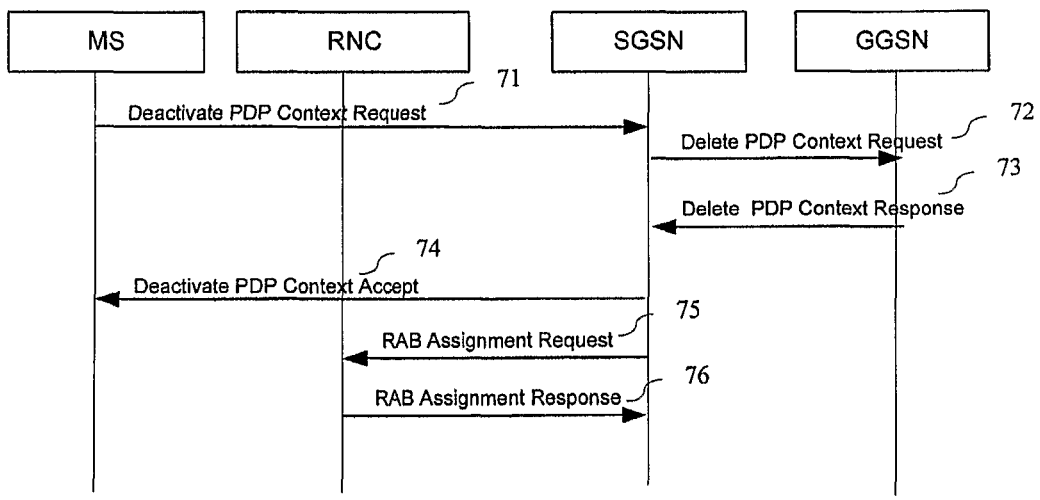
FIG. 7 depicts the existing PDP Context Deactivation initiated by the MS.

FIG. 7 depicts the existing PDP Context Deactivation initiated by the MS. As shown in FIG. 7, the MS sends (step 71) the Deactivate PDP Context Request message to the SGSN, to deactivate the PDP context. Then the SGSN sends (step 72) the Delete PDP Context Request message to the GGSN to inform the GGSN delete the PDP Context. The GGSN then sends (step 73) the Delete PDP Context Response message to the SGSN. Further the SGSN sends (step 74) the Deactivate PDP Context Accept to make the MS know that the deactivation of the PDP context is accepted. And the SGSN sends (75) the RAB Assignment Request message to RNC to request for releasing RAB. The RNC sends (76) the RAB Assignment Response message, which carries the information of unsuccessfully transmitted downlink data volume, to the SGSN, and then the SGSN knows the volume of unsent downlink data.

Figure 8:
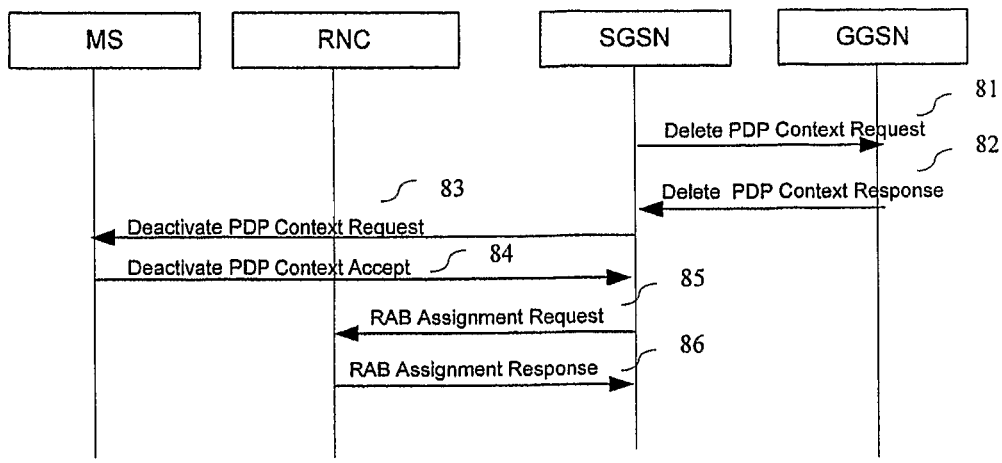
FIG. 8 depicts the existing PDP Context Deactivation initiated by the SGSN.

FIG. 8 depicts the existing PDP Context Deactivation initiated by the SGSN. The SGSN sends (step 81) the message "Delete PDP Context Request" to the GGSN to inform the GGSN delete the PDP context. The GGSN sends (step 82) the message of Delete PDP Context Response to the SGSN as a responsive. And then the SGSN sends (step 83) the Deactivate PDP Context Request message to MS. Then the MS sends (step 84) the Deactivate PDP Context Accept message to the SGSN. The SGSN sends (step 85) the message of RAB Assignment Request to RNC to request for releasing RAB. And the RAB sends (step 86) the RAB Assignment Response message, which carries the information of unsuccessfully transmitted downlink data volume, to the SGSN, and then the SGSN knows the volume of unsent downlink data.

Figure 9:
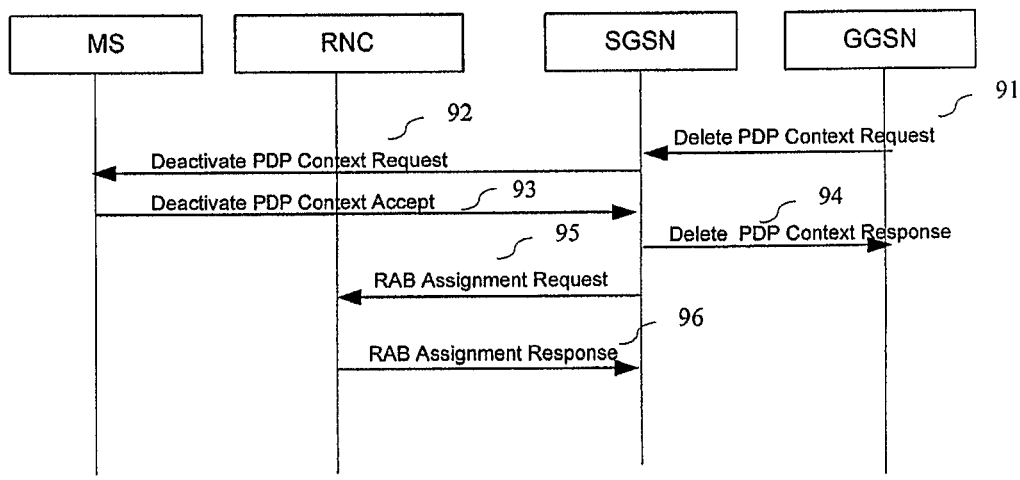
FIG. 9 depicts the existing PDP Context Deactivation initiated by the GGSN.

FIG. 9 depicts the existing PDP Context Deactivation initiated by the GGSN. The GGSN sends (step 91) the message of Delete PDP Context Request to the SGSN to inform the SGSN of deleting the PDP context. And then the SGSN sends (step 92) the message of Deactivate PDP Context Request to the MS to request for deactivating the PDP context. Then the MS sends (step 93) the message of Deactivate PDP Context Accept to the SGSN. Thus, the SGSN sends (step 94) the message of Delete PDP Context Response to the GGSN. And the SGSN also sends (step 95) the message of RAB Assignment Request to RNC to request for releasing RAB. And the RAB sends (step 96) the RAB Assignment Response message, which carries the information of unsuccessfully transmitted downlink data volume, to the SGSN, and then the SGSN knows the volume of unsent downlink data.

From above descried, it can be seen, in the existing PDP Context Deactivation Procedure initiated by MS and SGSN, the SGSN informs the GGSN of deleting the PDP Context before obtaining the information of the volume of unsuccessfully transmitted data from the RNC by the RAB Assignment Response message. Therefore, the CDR generated by SGSN does not include any field of unsuccessfully transmitted data volume, such that the overcharging may be caused. Further, the GGSN do not be informed of the information of the volume of unsuccessfully transmitted data from the RNC, thus the CDR generated by the GGSN does not include any field of unsuccessfully transmitted data volume either.

For the existing PDP Context Deactivation Procedure initiated by GGSN, the SGSN informs RNC to release the RAB after SGSN returns the Delete PDP Context Response message to GGSN. That is to say the SGSN receives the Unsuccessfully Transmitted Downlink Data Volume in the message of RAB Assignment Response from RNC after SGSN confirms with the GGSN to delete the PDP context. As a result, there is no way for SGSN or GGSN to record the "RNC Unsent Downlink Volume" in S-CDR or G-CDR.

Figure 10:
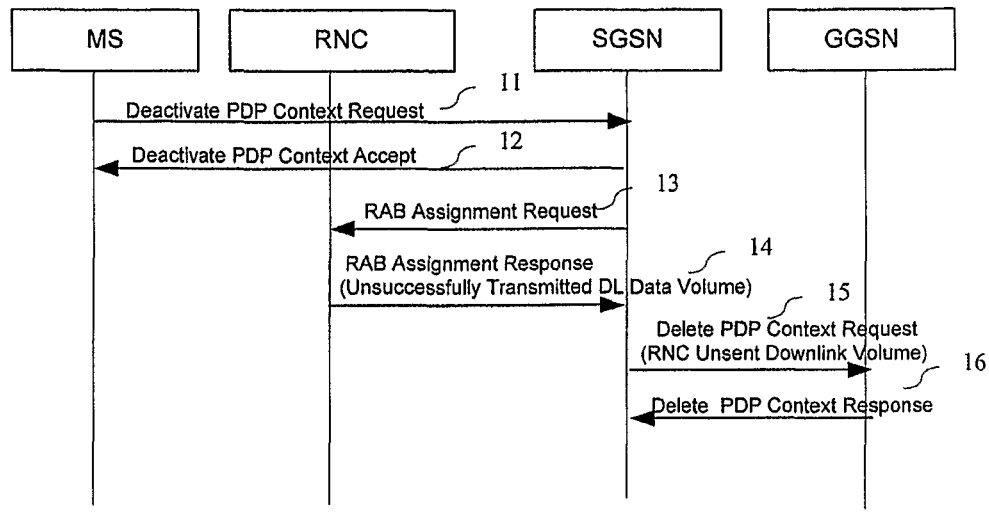
FIG. 10 depicts the PDP context Deactivation initiated by MS according to the present invention.

FIG. 10 depicts the PDP context Deactivation initiated by MS according to the present invention. In step of 11, the MS initiates a PDP context deactivation by sending the Deactivate PDP Context Request message to the SGSN. The SGSN then sends Deactivate PDP Context Accept message to the MS in step of 12. Also, the SGSN requests to release RAB with the RNC by the message of RAB Assignment Request in step of 13. And in step of 14, the RNC sends a response message of RAB Assignment Response carrying the information relating to the RNC unsuccessfully transmitted downlink data volume when the RNC have detected the unsent downlink data. Then the SGSN sends the message of Delete PDP Context Request with the information relating the volume of unsuccessfully transmitted downlink data to the GGSN in step of 15, to make the GGSN be informed of said information; wherein the contents of message "Delete PDP Context Request" are shown in Table 5. With obtaining the message including unsuccessfully transmitted downlink data volume, the GGSN thus generates the CDR with a field of recording said unsent downlink data volume. Final, as a response, in step of 16, a Delete PDP Context Response message is sent by GGSN to the SGSN.

Figure 11:
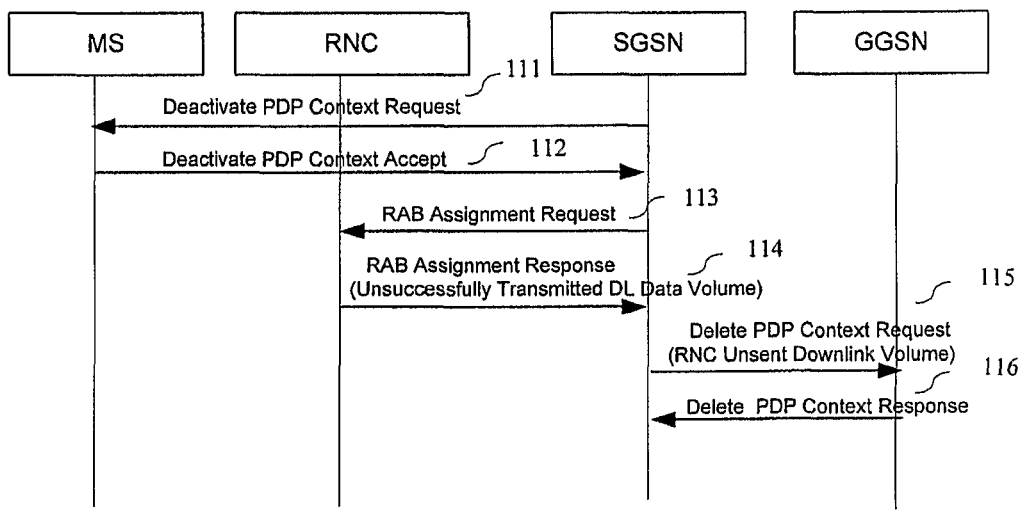
FIG. 11 depicts the PDP context Deactivation initiated by SGSN according to the present invention.

FIG. 11 depicts the PDP context Deactivation initiated by SGSN according to the present invention. In step of 111, the SGSN initiates a PDP context deactivation by sending the Deactivate PDP Context Request message to the MS. The MS then sends the Deactivate PDP Context Accept message to the SGSN in step of 112. In next step of 113, the SGSN requests the RNC to release RAB by the message of RAB Assignment Request. And in step of 114, the RNC sends a response message of RAB Assignment Response carrying the information relating to the RNC unsuccessfully transmitted downlink data volume when the RNC have detected the unsuccessfully transmitted downlink data. Then the SGSN sends the message of Delete PDP Context Request with the information relating to the volume of unsuccessfully transmitted downlink data to the GGSN in step of 115, to make the GGSN be informed of said information; wherein the contents of message "Delete PDF Context Request" are shown in Table 5. With receiving the message including unsuccessfully transmitted downlink data volume, the GGSN thus generates the CDR with a field of recording said unsent downlink data volume. Finally, as a response, in step of 116, the Delete PDP Context Response message is sent by GGSN to the SGSN.

Figure 12:
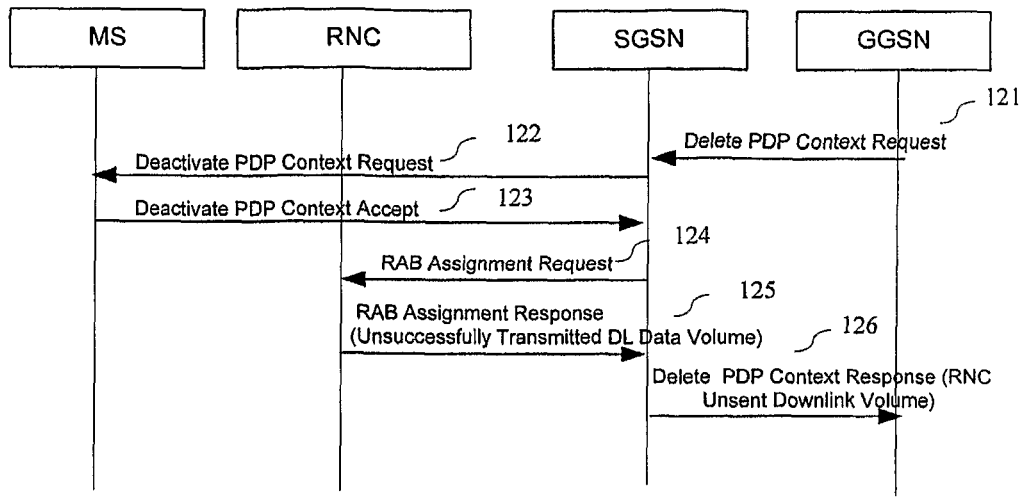
FIG. 12 depicts the PDP context Deactivation initiated by GGSN according to the present invention.

FIG. 12 depicts the PDP context Deactivation initiated by GGSN according to the present invention. In step of 121, the GGSN initiates a PDP context deactivation by sending the Deactivate PDP Context Request message to the SGSN. The SGSN then sends the message of Deactivate PDP Context Request to the MS in step of 122. Then, in step of 123, the MS sends the message of Deactivate PDP Context Accept to the SGSN, and the SGSN requests the RNC to release RAB by the message of RAB Assignment Request in step of 124. And in step of 125, the RNC sends a response message of RAB Assignment Response carrying the information relating to the RNC unsuccessfully transmitted downlink data volume when there is unsuccessfully transmitted downlink data. Then the SGSN sends the message of Delete PDP Context Response with the information relating to unsuccessfully transmitted downlink data volume to the GGSN as shown in step of 126, to make the GGSN know said information; wherein the contents of Delete PDP Context Response message is shown in Table 6. Thus the GGSN generates CDR based on the message sent by the SGSN in above step, with a field recording the unsuccessfully transmitted downlink data.

From above, it can be seen that the SGSN receives the information of the volume of RNC unsuccessfully transmitted downlink data via the RAB Assignment Response message before sends the Delete PDP Context Request message to the GGSN. Accordingly, the CDR generated by the SGSN includes the record in which the unsuccessfully transmitted downlink data volume is recorded. Moreover, since the information relating to the volume of unsuccessfully transmitted downlink data is included in the pre-determined information element, which further is included in the PDP context charging data, the PDP context activation, the PDP context modification and the PDP context deactivation messages in a proper manner, the GGSN is informed of said volume from the SGSN. Thus, the CDR generated by the GGSN also includes the field recording the unsent data volume.

Figure 13:
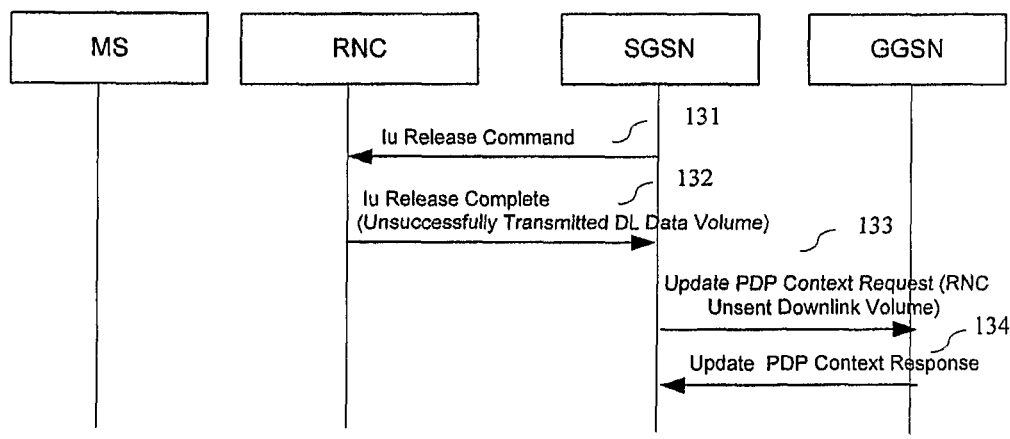
FIG. 13 depicts Iu release procedure according to the present invention.

FIG. 13 depicts Iu release procedure according to the present invention. The SGSN sends (step 131) a Iu release command to RNC, and RNC returns (step 132) a message of Iu release complete to the SGSN which includes the unsuccessfully transmitted downlink data volume if there is unsuccessfully transmitted downlink data volume. Then the SGSN sends (step 133) the information on the unsuccessfully transmitted downlink data volume to the GGSN via a message "Update PDP Context Request" that has the information elements shown in table 3. In result, the GGSN is informed of volume of unsent downlink data, so it records the unsent downlink data volume in G-CDR. And then the GGSN sends (step 134) a message of "Update PDP context Response" to the SGSN.

It can be seen that the volume of unsuccessfully transmitted downlink data is sent by SGSN to the GGSN, to make the GGSN includes the record of unsuccessfully transmitted downlink data into the CDR, such that the overcharging can be efficiently avoided.

It can be appreciated for those skilled in the art that the gateway support node and the serving support node may be like computer device, where the method of the present invention can be executed as programmable steps.

Although the exemplary embodiments have been described above, the present invention is not limited to these exemplary embodiments. The exemplary embodiments may be used in combination or each of the embodiments may be partially modified with the spirit and scope the present invention.

While the preferred exemplary embodiments of the present invention have been described using specific items, such description is for illustrative purpose only, and it is to be understood that changes and variations may be made without departing from the spirit and scope the following claims.

The invention claimed is:

1. A method for a node involved in downlink data transport between a gateway support node and a mobile station, the method comprising:
creating information relating to a volume of unsuccessfully transmitted downlink data by the node;
sending, by the node, the information to the gateway support node by including the information in an information element pre-determined for unsuccessfully transmitted downlink data, wherein the information element is included in one of a Packet Data Protocol (PDP) context activation message, a PDP context modification message, and a PDP context deactivation message.

2. The method of claim 1 where the message is a request type or a response type.

3. The method of claim 1 where the node is a serving support node.

4. A method for a gateway support node sending downlink data to a mobile station, the method comprising:
receiving, by the gateway support node, information relating to a volume of unsuccessfully transmitted downlink data in an information element pre-determined for unsuccessfully transmitted downlink data volume, wherein the information element is included in a message, and wherein the message comprises one of a Packet Data Protocol (PDP) context activation message, a PDP context modification message, a PDP context deactivation message;
including the information in a charging data record; and
sending the charging data record for billing.

5. A node in a telecommunication network comprising a gateway support node sending downlink data to a mobile station, the node comprising:
a processing unit configured to:
create information relating to a volume of unsuccessfully transmitted downlink data;
include the information in an information element pre-determined to contain an unsuccessfully transmitted downlink data volume, wherein the information element is included in a message, wherein the message comprises one of a Packet Data Protocol (PDP) context activation message, a PDP context modification message, a PDP context deactivation message; and
a sending unit configured to send the information in the message to the gateway support node.

6. The node of claim 5:
wherein the message is a request type message or a response type message.

7. The node of claim 5 wherein the node is a serving support node.

8. A gateway support node in a telecommunication network sending downlink data to a mobile station, the gateway support node comprising:
- a receiving unit configured to receive information relating to a volume of unsuccessfully transmitted downlink data in an information element pre-determined to contain an unsuccessfully transmitted downlink data volume, wherein the information element is included in one of a Packet Data Protocol (PDP) context activation message, a PDP context modification message, a PDP context deactivation message;
- a processing unit configured to include the information in a charging data record;
- a sending unit configured to send the charging data record for billing.

9. The gateway support node of claim 8 wherein the processing unit is configured to include the information element in a pre-determined field of a charging data record.

10. A telecommunication network comprising:
- a gateway support node sending downlink data to a mobile station;
- another node operatively connected to the gateway support node; the another node comprising:
  - a processing unit configured to:
    - create information relating to a volume of unsuccessfully transmitted downlink data:
    - include the information in an information element pre-determined to contain an unsuccessfully transmitted downlink data volume, wherein the information element is included in a message, and wherein the message comprises one of a Packet Data Protocol (PDP) context activation message, a PDP context modification message, a PDP context deactivation message;
  - a sending unit configured to send the information in the message to the gateway support node;
- the gateway support node comprising:
  - a receiving unit configured to receive information relating to a volume of unsuccessfully transmitted downlink data; and
  - a processing unit configured to include the information in a charging data record;
    - a sending unit configured to send the charging data record for billing.

11. A computer program product stored in a non-transient computer readable medium for controlling a programmable data processing device, the data processing device being part of a node involved in downlink data transport between a gateway support node and a mobile station, the computer program product comprising software code instructions which, when run on the data processing device, causes the data processing device to:
- create information relating to a volume of unsuccessfully transmitted downlink data by the node by including the information in an information element pre-determined to contain an unsuccessfully transmitted downlink data volume, wherein the information element is included in a message, and wherein the message comprises one of a Packet Data Protocol (PDP) context activation message, a PDP context modification message, a PDP context deactivation message; and
- send the information in the message to a gateway support node.

12. A computer program product stored in a non-transient computer readable medium for controlling a programmable data processing device, the data processing device being part of a gateway support node sending downlink data to a mobile station, the computer program product comprising software code instructions which, when run on the data processing device, causes the data processing device to:
- receive information relating to a volume of unsuccessfully transmitted downlink data by the gateway support node by receiving the information in an information element pre-determined to contain an unsuccessfully transmitted downlink data volume, wherein the information element is included in one of a Packet Data Protocol (PDP) context activation message, a PDP context modification message, and a PDP context deactivation message;
- include the information in a charging data record;
- send the charging data record for billing.

13. A method for a serving support node which generates a charging data record in a Packet Data Protocol (PDP) context deactivation procedure initiated by a mobile station, the method comprising:
- receiving a deactivate PDP request from the mobile station;
- sending a deactivate PDP accept to the mobile station in response to the deactivate request;
- sending a Radio Access Bearer (RAB) assignment request to a radio network controller;
- receiving a response to the RAB assignment request carrying information relating to a volume of unsuccessfully transmitted downlink data from the radio network controller;
- sending a delete PDP request with the information relating to the volume of unsuccessfully transmitted downlink data to a gateway support node.

14. A method for a serving support node which generates a charging data record in a Packet Data Protocol (PDP) context deactivation procedure initiated by the node, the method comprising:
- sending a deactivate PDP request to a mobile station;
- receiving a deactivate PDP accept from the mobile station in response to the deactivate request;
- sending a Radio Access Bearer (RAB) assignment request to a radio network controller;
- receiving a response to the RAB assignment request carrying information relating to a volume of unsuccessfully transmitted downlink data from the radio network controller;
- sending a delete PDP request with the information relating to the volume of unsuccessfully transmitted downlink data to a gateway support node.

15. A method for a serving support node which generates a charging data record in a Packet Data Protocol (PDP) context deactivation procedure initiated by a gateway support node, the method comprising:
- receiving a delete PDP request from the gateway support node;
- sending a deactivate PDP request from the serving support node to a mobile station;
- receiving a deactivate accept from the mobile station in response to the deactivate request;
- sending a Radio Access Bearer (RAB) assignment request to a radio network controller;
- receiving a response to the RAB assignment request carrying information relating to a volume of unsuccessfully transmitted downlink data from the radio network controller;
- sending a delete PDP response with the information relating to the volume of unsuccessfully transmitted downlink data to a gateway support node.

16. A serving support node which generates a charging data record, the serving support node including
    a sending unit configured to send a request or response to one or more of a gateway support node, a radio network controller, and a mobile station;
    a receiving unit configured to receive a request or response from one or more of a gateway support node, a radio network controller, and a mobile station;
    a processing unit configured to generate the charging data record;
    wherein the sending unit is configured to send a delete Packet Data Protocol (PDP) request or response to the gateway support node after the receiving unit receives information relating to a volume of unsuccessfully transmitted downlink data in a procedure of PDP context deactivation, wherein the delete PDP request or response carries information relating to the volume of unsuccessfully transmitted downlink data.

* * * * *